United States Patent

Hendrickson

[15] 3,673,487
[45] June 27, 1972

[54] REGULATED D.C. POWER SUPPLY
[72] Inventor: Melvin C. Hendrickson, Elmhurst, Ill.
[73] Assignee: Zenith Radio Corporation, Chicago, Ill.
[22] Filed: Sept. 8, 1970
[21] Appl. No.: 70,193

[52] U.S. Cl. ............................ 321/18, 321/47, 323/22 T, 307/252 UA
[51] Int. Cl. .............................................. H02m 7/12
[58] Field of Search ............... 321/18, 47; 323/22 T, 22 ZS; 307/133, 252 UA

[56] References Cited

UNITED STATES PATENTS

| | | | |
|---|---|---|---|
| 3,366,871 | 1/1968 | Connor | 323/22 T |
| 3,377,546 | 4/1968 | Schott | 323/DIG. 1 |
| 3,391,332 | 7/1968 | Funfstvck | 321/47 X |
| 3,506,852 | 4/1970 | Hart | 307/252 UA |
| 3,564,388 | 2/1971 | Nolf | 321/18 |
| 3,597,675 | 8/1971 | Peek et al. | 321/18 |
| 3,286,135 | 11/1966 | Haver et al. | 323/DIG. 1 |
| 3,371,269 | 2/1968 | Wattson | 321/18 X |
| 3,221,241 | 11/1965 | Greenberg et al. | 321/18 X |
| 3,335,291 | 8/1967 | Gutzwiller | 307/252 UA |
| 3,365,654 | 1/1968 | Johnston | 323/DIG. 1 |
| 3,462,671 | 8/1969 | Lawn | 321/47 X |
| 3,493,835 | 2/1970 | Hellmann | 307/133 X |

*Primary Examiner*—William M. Shoop, Jr.
*Attorney*—John J. Pederson

[57] ABSTRACT

A switching-type regulating power supply which dissipates little power, minimizes radio frequency interference, and provides a constant DC output voltage has a full-wave rectifier with a regulating means in its common return circuit to switch the full-wave rectified current supplied to an output filter on and off. The current is switched on when there is zero voltage across the full-wave rectifier thus minimizing radio-frequency-interference-causing surge currents, and this is accomplished by a phase synchronizer which is coupled to the input terminals of the full-wave rectifier and also coupled to the control means which applies a variable duty cycle control voltage to the regulating means. The control means is coupled to the output voltage filter and generates a variable duty cycle control voltage in response to changes in the DC output voltage of the supply. This varying duty cycle control voltage is applied to the regulating means to control the time in which the regulating means allows current to flow to the output filter which results in output voltage stabilization.

7 Claims, 3 Drawing Figures

Inventors
Melvin C. Hendrickson

By *John J. Pederson*
Attorney

Inventor
Melvin C. Hendrickson
By John J. Pederson
Attorney

REGULATED D.C. POWER SUPPLY

BACKGROUND OF THE INVENTION

The present invention relates generally to a regulated DC power supply and more particularly to a switching-type regulating power supply affording a high degree of output voltage regulation with high efficiency while minimizing radio frequency interference.

There are numerous applications in which it is desirable to provide a relatively constant direct-current output voltage regulated against the variations in input line voltage and load conditions. One system for such use employs a rectifying circuit which changes AC line voltage of varying amplitude to DC voltage of varying amplitude. A transistor or some other variable impedance element is then interposed in series with the fluctuating DC output voltage and the load. This type of system is commonly referred to as a series type voltage regulator. In general, it operates by comparing the regulated voltage with a reference voltage standard, deriving a voltage which is representative of the difference between the two and using this difference voltage to control the impedance of the transistor connected in series with the supply line. A negative feedback connection is used so that an increase in the difference voltage causes an increase in the impedance of the series transistor, increasing the voltage drop across the transistor and thereby causing the output voltage to drop to normal.

One problem encountered with the series regulating system is that it operates at low efficiency. This is due to the fact that a power dissipating device is placed in series with the source of DC voltage and the load. The series transistor is continuously in its active state, dissipating power. This makes it necessary to provide expensive heat-sinking means to prevent the series transistor from over-heating.

The low efficiency problem of the series regulator has been overcome with the introduction of the switching-type voltage regulator. In this type regulator, an electronic switch which dissipates little power is connected in series between the DC voltage source or the voltage rectifier and the output load. The time in which the switch conducts is controlled so that the output voltage may be stabilized. If the output voltage should decrease, the switch is left on longer, supplying more current to the load to increase the output voltage. Conversely, if the output voltage should increase, the electronic switch would be made to conduct for a shorter period of time thus decreasing the output voltage. Although this type of regulator provides reduced power dissipation, it has introduced other problems. One such problem is that on and off switching transitions create surge currents which cause radio frequency interference.

The method commonly used to eliminate this radio frequency interference is to introduce a fixed impedance in series with the electronic switch and the load to limit the surge currents produced during the on and off transitions of the switch. However, these series impedances introduce a power dissipating device in series with the load, once again lowering the efficiency of the regulating system.

Accordingly, it is an object of the present invention to provide a new and improved regulated DC power supply which avoids or minimizes the aforementioned difficulties of prior regulated DC power supplies.

A more specific object of the invention is to provide a regulated DC power supply which dissipates little power.

A further object of the invention is to provide a switching-type regulated DC power supply which minimizes radio frequency interference without introducing power dissipating devices in series with the loads

SUMMARY OF THE INVENTION

The present invention provides a regulated DC power supply having a full-wave rectifier with input terminals adapted for connection to a source of AC line voltage and an output filter coupled to the rectifier and having output terminals for connection to an external load. Control means are provided for generating a square-wave control voltage having a predetermined nominal duty cycle, and phase-synchronizing means are coupled to the input terminals of the rectifier and to the control means to provide phase synchronization of the square-wave control voltage with the line voltage. Duty-cycle-varying means are coupled to the output terminals and to the control means to vary the duty cycle inversely with changes in the DC output voltage developed at the output terminals. Voltage regulating means are coupled to the rectifier and are responsive to an applied control voltage for stabilizing the output voltage, and means coupled to the control means are provided for applying the variable duty cycle control voltage to the regulating means.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
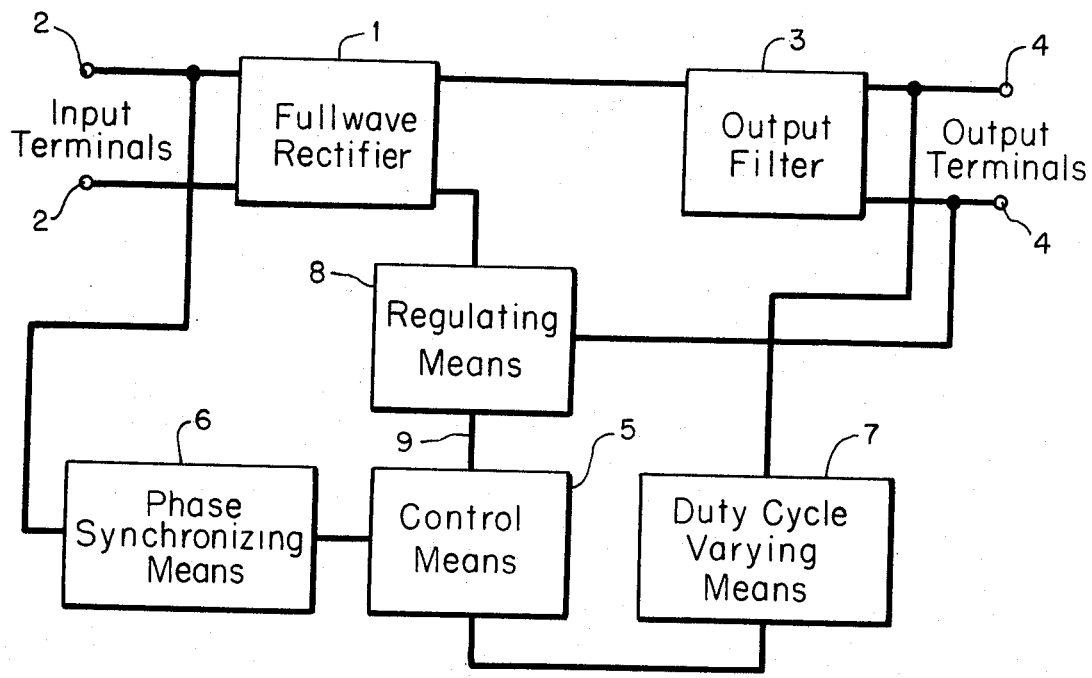
FIG. 1 is a block diagram of a regulated DC power supply system embodying the present invention.

Referring now to the block diagram of FIG. 1, the full-wave rectifier 1 has input terminals 2 adapted for connection to a source of AC line voltage, and is also coupled to output filter 3 which smooths out the full-wave rectified voltage. Output filter 3 has output terminals 4 adapted for connection to an external load. Control means 5 generates a square-wave control voltage having a predetermined nominal duty cycle and is phase-locked to the AC line by phase synchronizing means 6 which is coupled to input terminals 2. Control means 5 is coupled to the output terminals 4 by the duty-cycle-varying means 7 which supplies an output-dependent voltage to control means 5 to vary its duty cycle inversely with changes in the output voltage across terminals 4. Control means 5 is coupled to regulating means 8 by coupling means 9 and applies the varying-duty-cycle AC-synchronized control voltage to the regulating means 8 which is coupled in series with the full-wave rectifier 1 and output terminals 4 and acts as a switch to switch the full-wave rectified current supplied by the full-wave rectifier to the load on an off in response to the varying-duty-cycle control voltage, thus stabilizing the output voltage across output terminals 4.

Figure 2:
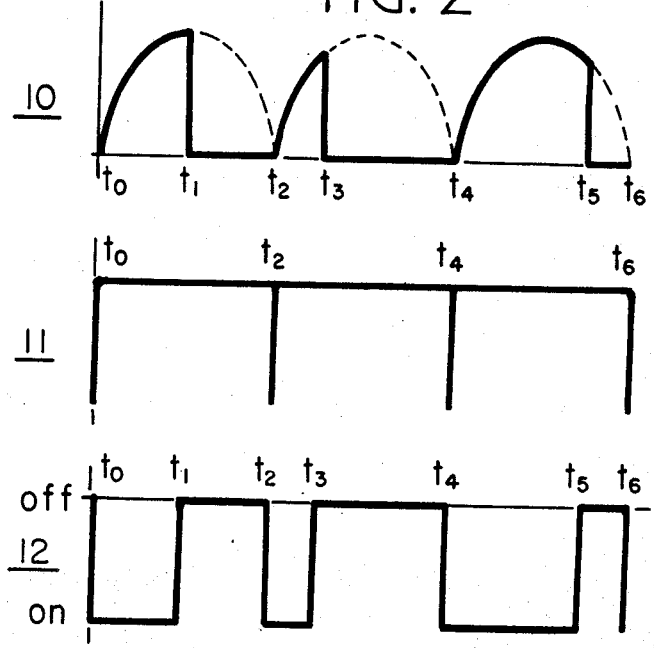
FIG. 2 is a graphical representation of signal waveforms as a function of time, which are helpful in understanding the operation of the system of FIG. 1.

The operation of the power supply system as represented in FIG. 1 may be more clearly understood with reference to the various waveforms in FIG. 2 drawn as a function of time, where the full-line curve of waveform 10 represents the current supplied to output filter 3 while the broken-line curve represents the unregulated output current from rectifier 1 in the absence of a regulating system, waveform 11 represents the output signal of phase synchronizer 6, and waveform 12 represents the control voltage output of control means 5.

Referring now to the waveforms of FIG. 2, the full-wave rectified current supplied by full-wave rectifier 1 is switched on when there is zero voltage across the rectifier or in other words at zero-crossing times $t_0$, $t_2$, and $t_4$. Thus, each control voltage duty cycle period begins at the zero crossings of the full-wave rectified current and is synchronized to the full-wave rectifier zero-crossing points by the phase-synchronizing means 6 of FIG. 1 whose output is represented by waveform 11. The phase-synchronizing means detects the zero-crossing times and provides at these times a sync pulse which synchronizes the control means to the full-wave rectified waveform.

Sometime during each full-wave rectified period the full-wave rectified current is switched off by the regulating means in response to the control voltage waveform 12. For illustrative purposes, the full-wave rectified current has been shown to be switched off at times $t_1$, $t_3$, and $t_5$. The full-wave rectifier 1 is allowed to supply current when the control voltage is at its "on" level and is switched off when the control voltage is at its "off" level. Therefore, during the period between $t_0$ and $t_2$ the full-wave rectifier beings to conduct at $t_0$ and is turned off at $t_1$ in response to the control voltage. The duty cycle of the control voltage is controlled by the duty cycle control means 7 which is coupled to the output filter 3. If the output voltage should tend to increase due to either increased line voltage or changes in the external load, the control voltage duty cycle will be made shorter causing the full-wave rectifier to conduct current to the output filter 3 for a shorter period of time. This case is represented in FIG. 2 by the period beginning at $t_2$ and ending at $t_4$. If the output voltage tends to decrease due to reduce line voltage or a change in the external load, the full-wave rectifier will be made to conduct for a longer period of time as represented by the period beginning at $t_4$ and ending at $t_5$ of FIG. 2, allowing more current to be supplied to the output filter to stabilize the output voltage.

Therefore, output voltage compensation is achieved during each full-wave rectified period. A current surge is not produced when the full-wave rectified current is turned on because switching transitions are synchronized with intervals of zero voltage across the full-wave rectifier. This minimizes the radio frequency interference of the supply. Also, because the regulating means acts as a switch, its power dissipation is small, resulting in high efficiency.

Figure 3:
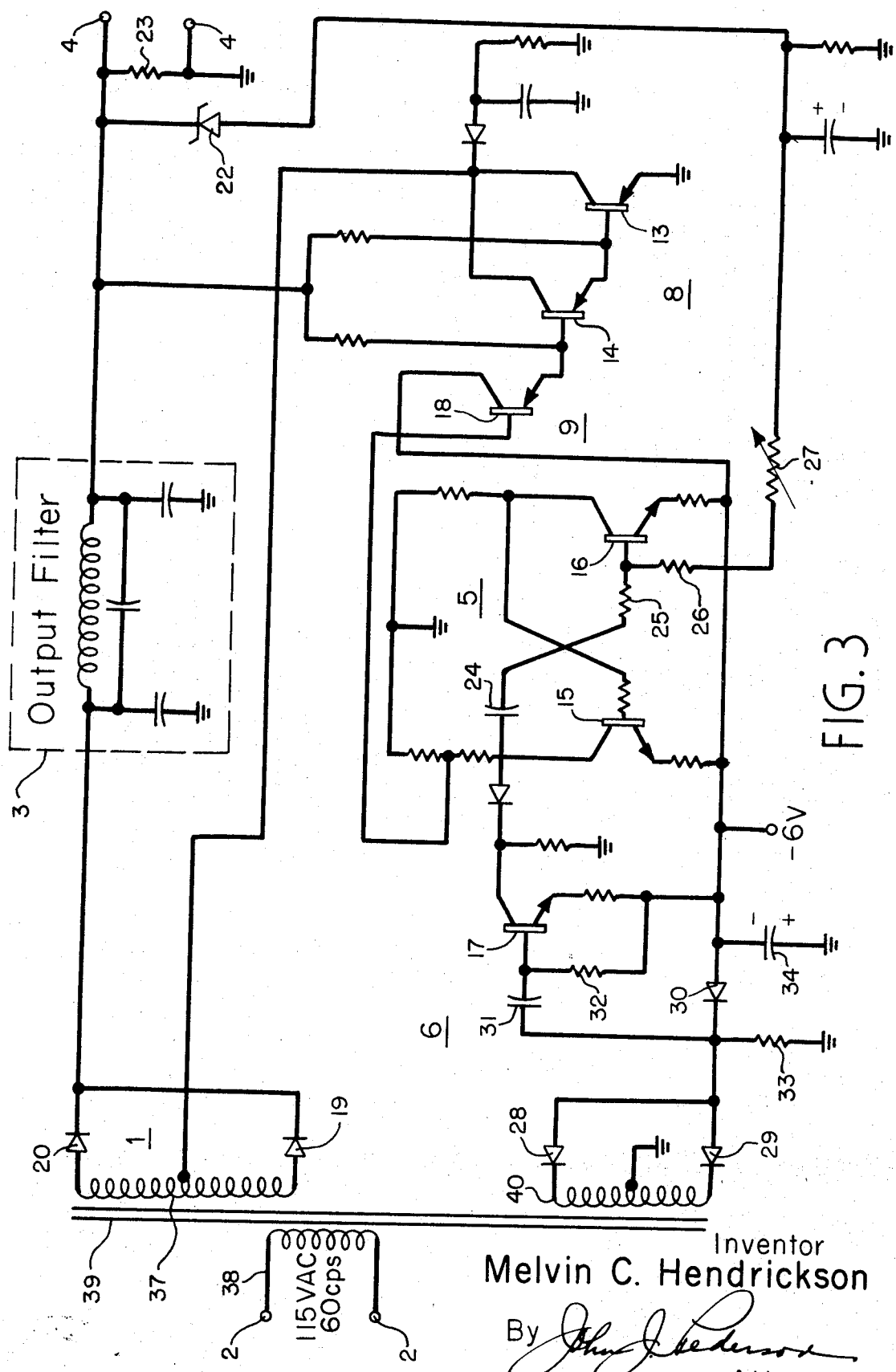
FIG. 3 is a schematic circuit diagram of a preferred embodiment of the invention.

The preferred embodiment of FIG. 3 supplies a constant DC output voltage of 130 volts. Transistors 13 and 14 connected in a Darlington pair configuration comprise the regulating means 8 of the power supply. A Darlington pair was chosen for its current handling capabilities but a single transistor could be used as well. Transistors 15 and 16 are connected with their accompanying components to form a monostable multivibrator which comprises the control means 5. Control multivibrator 5 is coupled to output filter 3 by the duty-cycle-varying means 7 which comprise series resistors 26 and 27 and zener diode 22. Transistor 18 comprises the coupling means 9 between the control means 5 and the regulating means 8 and is connected as an emitter-follower. Transistor 17 in conjunction with diodes 28 and 29 comprise the phase-synchronizing means 6 which provides the sync pulse to the control means 5 for synchronizing the control means with the full-wave rectified voltage produced by diodes 19 and 20 in conjunction with winding 37 of transformer 39. Winding 37 of transformer 39 is chosen so that a nominal AC line voltage will produce an RMS voltage across each center tap equal to the desired output voltage so that under normal input line and output load conditions a control voltage duty cycle of 50 percent is required to result in the desired output voltage. The full-wave rectifier is coupled to and supplies full-wave rectified current to output filter 3 when switched on. Resistor 23 represents the external load.

The cathodes of diodes 19 and 20 are connected together forming a common return circuit. The collectors of transistors 13 and 14 are coupled to the center tap of winding 37, and the emitter of transistor 13 is connected to ground which in effect connects it to the ground side of the external load 23. This places Darlington pair transistors 14 and 13 in series between load 23 and the common return circuit of the full-wave rectifier.

When the Darlington pair is forward biased, the full-wave rectified current is switched on to flow to the output filter 3. When the Darlington pair is back-biased, the full-wave rectified current is switched off.

The Darlington pair is driven by a monostable multivibrator which comprises transistors 15 and 16 and their accompanying circuitry. Monostable multivibrators are well-known in the art and are particularly useful in this switching power supply because a monostable multivibrator will always return to a known stable state. In this application, it is necessary that transistor 15 be nonconducting at the time of each AC line voltage zero crossing so that the phase synchronizing means 6 can force transistor 15 into its conducting state with a sync pulse to forward bias and switch on Darlington pair transistors 14 and 13 at each such zero crossing. An astable multivibrator may also be used for this application if the time constant necessary to make transistor 15 conducting is chosen to be sufficiently long so transistor 15 cannot possibly be conducting at the time it is to receive a sync pulse at its collector.

It is well known in the art that if the voltage to which capacitor 24 is to charge the base of transistor 16 is varied, the duty cycle of the monostable multivibrator can be varied. This duty cycle varies inversely with the charging voltage across capacitor 24 and is set to establish the multivibrator at some nominal duty cycle, for this application approximately 50 percent under nominal input line and output load conditions. If the charging voltage increases, the time necessary for transistor 16 to become forward-biased decreases, thus decreasing the duty cycle. The voltage to which capacitor 24 charges is made dependent on the power supply output voltage by the variable duty cycle means comprising zener diode 22 connected in series with fixed resistor 26 and variable resistor 27 from the load 23 to the base of transistor 16. Resistor 25 is connected between capacitor 24 and the base of transistor 16 to decrease the loading effect on capacitor 24. Fixed resistors 25, 26 and variable resistor 27 form a voltage divider at the base of transistor 16 so that slight variations in variable resistor 27 can be used to adjust the nominal duty cycle under normal line and load conditions for the desired output voltage. Zener diode 22 translates the output voltage down to approximately 5 volts, a level which will control the duty cycle of the multivibrator.

Transformer winding 40 of transformer 39 in conjunction with diodes 28 and 29 forms a −6 volt DC full-wave rectifying system which acts as an auxiliary power supply to sustain the operation of the multivibrator 5 and the phase-synchronizing means 6 and to supply the phase-synchronizing means 6 with zero-crossing information from which its sync pulse is derived. The base of transistor 17 is coupled to the junction of diodes 28 and 29 by capacitor 31. Resistor 33 is connected from the junction of diodes 28 and 29 to ground to complete a current path from the junction to ground. Diode 30 is connected between the junction of diodes 28 and 29 and smoothing capacitor 34 so that the AC zero-crossing information can be retained. Resistor 32 is connected from the base of transistor 17 to the −6 volts supplied by the auxiliary power supply to bias the base of transistor 17. The capacitive coupling to the junction of diodes 28 and 29 and base biasing at −6 volts results in a negative full-wave rectified waveform which tends slightly more positive than −6 volts at the zero-crossing point, forward biasing transistor 17, and resulting in a sync pulse at the collector of transistor 17 which is approximately 1 millisecond long and −5 volts in amplitude. This is coupled to the collector of transistor 15 making it conductive and thus beginning the multivibrator duty cycle period at the zero crossing.

The auxiliary −6 volt DC power supply is unregulated to enhance the duty cycle control of the multivibrator. Because the supply is connected to the emitter resistors of the multivibrator, the voltage necessary to forward bias transistor 16 will vary with changing input voltage. This has the same effect as varying the voltage to which capacitor 24 charges. For instance, if the input line voltage should increase, a shorter duty cycle is desired. Not only will the charging voltage across capacitor 24 increase, decreasing the duty cycle, but the voltage required to forward bias transistor 16 will decrease as well, because the supply voltage becomes more negative, thus effectively increasing the charging voltage and resulting in a further shortening of the duty cycle.

The operation of the phase-synchronizing means 6 is as follows. At each zero crossing point, transistor 17 produces a sync pulse which is applied to the collector of transistor 15 of control multivibrator 5, making transistor 15 conductive. The collector voltage of transistor 15 goes negative, thus forward biasing emitter follower 18 and Darlington pair transistors 14 and 13 to switch the full-wave rectified current on at the zero cross point. The potential established at the base of transistor 16 by the variable duty cycle means coupled to the output load 23 determines how long it will take capacitor 24 to charge sufficiently to forward bias transistor 16 to make it conductive and to make transistor 15 nonconductive. When this point is reached, sometime during the full-wave rectified period, transistor 15 ceases to conduct making its collector approximately ground potential which back-biases emitter follower 18 and Darlington pair transistors 14 and 13 thus switching off the full-wave rectified current supplied to the load.

If the output voltage increases, the voltage at the base of transistor 16 will be increased causing capacitor 24 to charge to the forward biasing voltage for transistor 16 faster; this shortens the conduction duty cycle of the full-wave rectifier thus tending to decrease the output voltage and stabilize it at its nominal value. Conversely, if the output voltage decreases, the voltage to which capacitor 24 tends to charge decreases making the charging time of capacitor 24 longer and allowing the full-wave rectifier to conduct current to the output filter for a longer period of time to increase the output voltage and to stabilize it at its nominal value.

Output voltage stabilization is achieved during each full-wave rectified period, and during each period the time in which the current is supplied to the output filter is controlled in response to the output voltage. The full-wave rectified current is switched on at zero crossing times, minimizing radio frequency interference. The present invention makes it possible to maintain a constant DC output voltage at high efficiency because there are no power dissipating elements in series with the external output load as compared to the series-type voltage regulators or switching-type voltage regulators which require power dissipating elements in series with the load to minimize radio frequency interference.

The preferred embodiment of the invention is capable of maintaining a voltage output to within 1 percent of 130 volts for changes in input AC line voltage of ±10 percent and load currents variations from 780 ma. to 435 ma. The practice of the present invention is not limited to the provision of a 130-volt output, but may be employed for almost any desired output voltage so long as the proper regulating transistor is chosen so that its breakdown voltage and current limits are not exceeded.

By way of illustration and not as a limitation, typical values of the more significant components of the preferred embodiment are given below:

| | | |
|---|---|---|
| Transistor 13 | Type | MP3731 |
| Transistor 14 | Type | MP3731 |
| Capacitor 24 | Microfarads | 0.033 |
| Resistor 25 | Ohms | 56K |
| Resistor 26 | Ohms | 150K |
| Variable Resistor 27 | Ohms | 500K |
| Zener Diode | Volts | 125V |

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A regulated DC power supply comprising:
    a full-wave rectifier having input terminals adapted for connection to a source of AC line voltage;
    an output voltage filter coupled to said rectifier and having output terminals for connection to an external load;
    control means including a multivibrator having no more than one stable state for generating a square-wave control voltage having a predetermined nominal duty cycle;
    means including a transistor coupled to said input terminals of said full-wave rectifier and to said control means for detecting zero crossings of said AC line voltage and to provide trigger pulses in response to said detected zero crossings for phase-synchronizing said square-wave control voltage with said line voltage;
    means coupled to said output terminals and to said control means for varying said duty cycle inversely with changes in the DC output voltage developed at said output terminals;
    voltage regulating means coupled to said rectifier and responsive to an applied control voltage for stabilizing said output voltage;
    and means coupled to said control means for applying the variable-duty-cycle control voltage to said regulating means.

2. A switching-type regulated power supply which dissipates little power, minimizes radio frequency interference and provides a constant DC voltage output comprising:
    a first full-wave rectifier comprising a pair of diodes having a common return circuit and having input terminals adapted for connection to a source of AC line voltage;
    an output voltage filter coupled to said first rectifier and having output terminals for connection to an external load;
    a multivibrator having no more than one stable state for generating a square-wave control voltage having a predetermined nominal duty cycle;
    means including a second full-wave rectifier and a transistor coupled to said input terminals of said first full-wave rectifier and to said multivibrator for detecting the zero-voltage crossings of the AC voltage across said first full-wave rectifier and to provide trigger pulses in response to said zero-voltage crossings for synchronizing the beginning of its duty cycle period with said zero-voltage crossings;
    means coupled to said output terminals and to said multivibrator for varying said duty cycle inversely with changes in the DC output voltage developed at said output terminals;
    voltage regulating means comprising a switch coupled in series with said common return circuit and said output terminals and responsive to an applied control voltage for stabilizing said output voltage;
    and means coupled to said multivibrator for applying the variable-duty-cycle control voltage to said switch to switch it on in synchronism with said zero-voltage crossings thereby to eliminate radio-frequency-interference-causing current surges.

3. A switching-type regulated power supply in accordance with claim 2, wherein said varying means comprises a zener diode in series with a variable impedance coupled from said output terminals to said control means.

4. A switching-type regulated power supply in accordance with claim 2, in which said multivibrator is powered by an auxiliary power supply coupled to said input terminals of said first full-wave rectifier, and in which said auxiliary power supply is unregulated for providing additional output voltage stabilization.

5. A switching-type regulated power supply in accordance with claim 2, wherein said switch included in said voltage regulating means comprises a transistor.

6. A switching-type regulated power supply in accordance with claim 2, wherein said switch included in said voltage regulating means comprises two transistors connected in a Darlington pair configuration.

7. A switching-type regulated power supply in accordance with claim 2, wherein said variable-duty-cycle control voltage applying means comprises an emitter follower.

* * * * *